United States Patent
Haraki et al.

(10) Patent No.: US 9,945,596 B2
(45) Date of Patent: Apr. 17, 2018

(54) HEAT PUMP APPARATUS

(71) Applicant: Panasonic Intellectual Property Management Co., Ltd., Osaka (JP)

(72) Inventors: Yu Haraki, Osaka (JP); Hiroyuki Itsuki, Tottori (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 319 days.

(21) Appl. No.: 14/696,112

(22) Filed: Apr. 24, 2015

(65) Prior Publication Data

US 2015/0323226 A1    Nov. 12, 2015

(30) Foreign Application Priority Data

May 8, 2014   (JP) .................................. 2014-096996
May 8, 2014   (JP) .................................. 2014-096998

(51) Int. Cl.
*F25B 49/02*    (2006.01)
*F25B 13/00*    (2006.01)

(52) U.S. Cl.
CPC .............. *F25B 49/02* (2013.01); *F25B 13/00* (2013.01); *F25B 2313/0271* (2013.01); *F25B 2600/11* (2013.01); *F25B 2600/13* (2013.01); *F25B 2700/21152* (2013.01); *F25B 2700/21163* (2013.01); *Y02B 30/745* (2013.01)

(58) Field of Classification Search
CPC ...... F25B 13/00; F25B 13/0271; F25B 49/02; F25B 2600/11; F25B 2600/13; F25B 2700/21152; F25B 2700/21163; Y02B 30/745
See application file for complete search history.

(56) References Cited

U.S. PATENT DOCUMENTS

| | | | | |
|---|---|---|---|---|
| 4,593,534 A | * | 6/1986 | Bloomfield | F25B 1/00 417/48 |
| 5,768,906 A | * | 6/1998 | Tsenter | F25B 17/12 165/104.12 |
| 6,167,721 B1 | * | 1/2001 | Tsenter | C09K 5/08 62/259.2 |
| 7,219,506 B2 | * | 5/2007 | Kang | F24F 11/008 62/176.3 |
| 2002/0066277 A1 | * | 6/2002 | Tsenter | F04B 35/00 62/46.2 |
| 2010/0132386 A1 | * | 6/2010 | Bahar | F25B 1/00 62/115 |
| 2015/0059383 A1 | * | 3/2015 | Sakamoto | F25B 1/00 62/238.7 |

(Continued)

FOREIGN PATENT DOCUMENTS

JP    2003-262424    9/2003

*Primary Examiner* — Marc Norman
(74) *Attorney, Agent, or Firm* — McDermott Will & Emery LLP

(57) ABSTRACT

A heat pump apparatus includes an evaporator evaporating a refrigerant, an electrochemical compressor compressing the refrigerant evaporated in the evaporator, and a condenser condensing the refrigerant compressed by the electrochemical compressor. The heat pump apparatus is structured such that the refrigerant in a wet steam state is supplied from the evaporator to the electrochemical compressor.

16 Claims, 9 Drawing Sheets

(56) References Cited

U.S. PATENT DOCUMENTS

| | | | |
|---|---|---|---|
| 2015/0114829 A1* | 4/2015 | Bahar | F25B 30/02 |
| | | | 204/230.2 |
| 2015/0241091 A1* | 8/2015 | Bahar | F04B 37/02 |
| | | | 62/115 |
| 2016/0084534 A1* | 3/2016 | Bahar | F24H 1/185 |
| | | | 62/238.1 |
| 2016/0195306 A1* | 7/2016 | Junge | F25B 30/02 |
| | | | 62/498 |

* cited by examiner

HEAT PUMP APPARATUS

BACKGROUND

1. Technical Field

The present disclosure relates to a heat pump apparatus.

2. Description of the Related Art

When a voltage is applied to an electrolyte membrane used in a fuel cell, $H_2$ changes to a proton ($H^+$) and moves from one face to the other face of the electrolyte membrane. At this time, the proton moves inside the electrolyte membrane with polar compounds such as water, alcohol, and ammonia. A technique of compressing the gases of the polar compounds using this phenomenon is called "electrochemical compression". A compressor adopting electrochemical compression is called "electrochemical compressor". Japanese Unexamined Patent Application Publication No. 2003-262424 and U.S. Patent Application Publication No. 2010/0132386 disclose a heat pump apparatus using an electrochemical compressor.

SUMMARY

One non-limiting and exemplary embodiment provides techniques of improving the efficiency of a heat pump apparatus using an electrochemical compressor.

In one general aspect, the techniques disclosed here feature a heat pump apparatus including a main circuit that contains: an evaporator that evaporates a refrigerant in a liquid phase and generates the refrigerant in a wet steam state, and a compressor that compresses the refrigerant in the wet steam state with electrochemical compression, a condenser that condenses the compressed refrigerant.

The present disclosure improves the efficiency of the heat pump apparatus using an electrochemical compressor.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
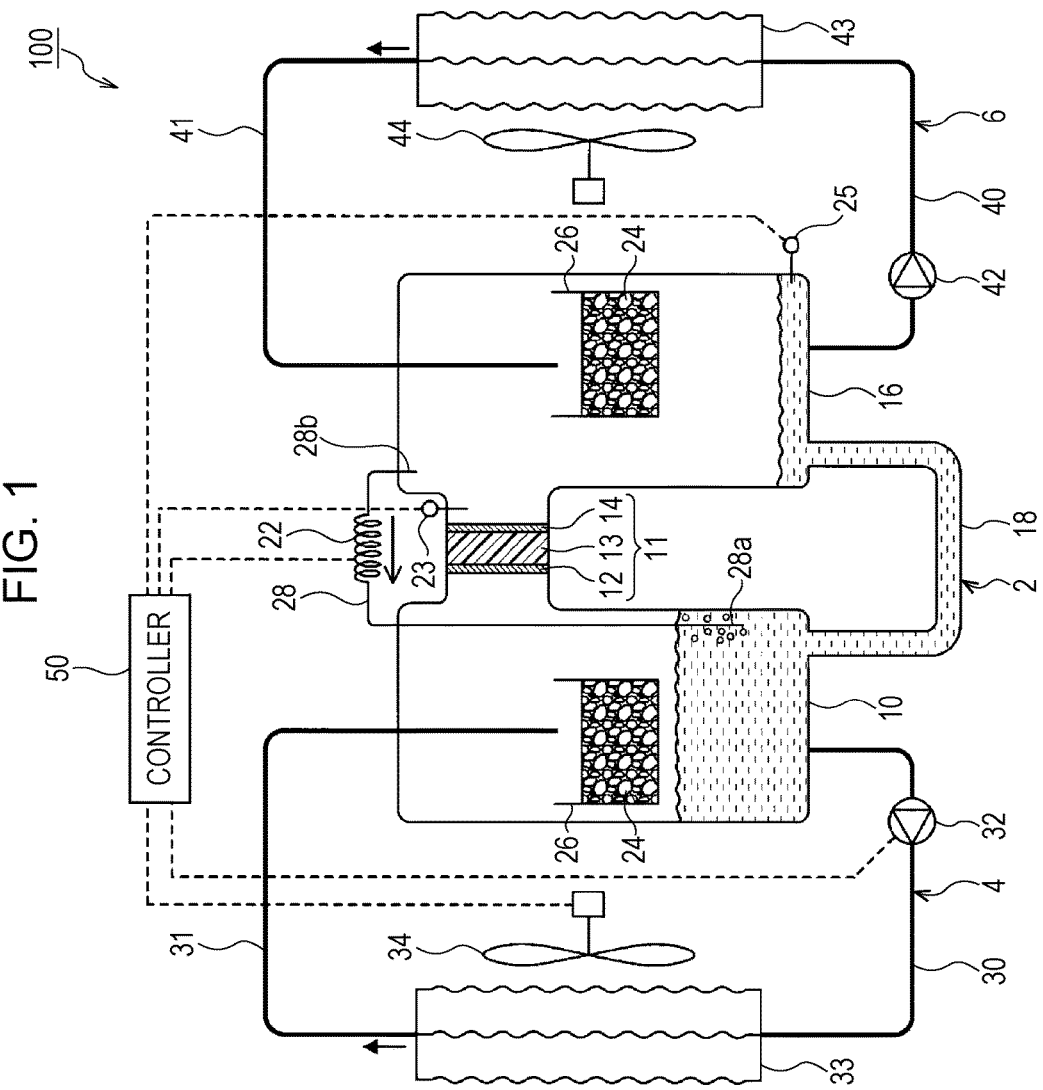
FIG. 1 is a block diagram of a heat pump apparatus according to one embodiment of the present disclosure.

DETAILED DESCRIPTION (Underlying Knowledge Forming Basis of the Present Disclosure)

The inventors have found the following matter regarding a heat pump apparatus using an electrochemical compressor as a result of intensive studies.

A heat pump apparatus using a mechanical compressor such as a displacement compressor and a turbo compressor is structured such that no wet steam is supplied to the compressor. When a wet steam is supplied to the mechanical compressor, components such as a valve, a cylinder, and an impeller may be damaged or corroded. Accordingly, a heat pump apparatus using a mechanical compressor is controlled such that a refrigerant steam having a predetermined degree of superheating (superheated steam) is suctioned into the compressor. However, a heat pump apparatus using an electrochemical compressor does not have such a requirement. From this background, the inventors have studied compression work required for an electrochemical compressor in each of the cases where the refrigerant is in a wet steam state and in a superheated steam state. As a result, the inventors have found that when the refrigerant is compressed to a predetermined pressure, less compression work is required for the compressor in the case where the refrigerant is in a wet steam state than in the case where the refrigerant is in a superheated steam state.

Based on the matters described above, the inventors have arrived at the disclosure in various aspects described below.

A heat pump apparatus according to a first aspect of the present disclosure includes a main circuit that includes: an evaporator that evaporates a refrigerant in a liquid phase and generates the refrigerant in a wet steam state, a compressor that compresses the refrigerant in the wet steam state with electrochemical compression, and a condenser that condenses the compressed refrigerant. In other words, a heat pump apparatus according to a first aspect of the present disclosure includes a main circuit that circulates a refrigerant flowing therein and that includes: an evaporator that is disposed on the main circuit and that evaporates the refrigerant in a liquid phase and generates the refrigerant in a wet steam state, a compressor that is disposed on the main circuit and that compresses the refrigerant in the wet steam state with electrochemical compression, and a condenser that is disposed on the main circuit and that condenses the compressed refrigerant. In other words, a heat pump apparatus according to a first aspect of the present disclosure includes an evaporator that stores a refrigerant in a liquid phase and evaporates the refrigerant, a compressor that compresses the refrigerant evaporated in the evaporator, a condenser that condenses the refrigerant compressed by the compressor, and a main circuit that annularly connects the evaporator, the compressor, and the condenser in this order and circulates the refrigerant. The evaporator evaporates the refrigerant and generates the refrigerant in a wet steam state. The compressor compresses the refrigerant in the wet steam state generated in the evaporator with electrochemical compression.

The heat pump apparatus according to the first aspect performs wet compression in an electrochemical compressor that compresses the refrigerant with electrochemical compression. Because the electrochemical compressor has no movable parts such as a valve, there is no risk of component damage even when wet compression is performed. When dry compression (compression of a refrigerant in a superheated steam state) is compared with wet compression (compression of a refrigerant in a wet steam state), the theoretical efficiency of refrigeration cycle is relatively high with wet compression and relatively low with dry compression. Therefore, according to the first aspect, compression work required for compressing the refrigerant to a predetermined pressure can be reduced by performing wet compression using an electrochemical compressor. The reasons why compression work can be reduced will be easily understood when considering an inclination of an isentrope in a p-h diagram, as described below. With this, the efficiency of the heat pump apparatus using an electrochemical compressor can be improved.

In a second aspect of the present disclosure, the evaporator of the heat pump apparatus according to the first aspect may include a wet steam generator that generates the refrigerant in the wet steam state. With the wet steam generator, a refrigerant steam having a sufficient wetness fraction can be generated.

In a third aspect of the present disclosure, the wet steam generator of the heat pump apparatus according to the second aspect may generate the refrigerant in the wet steam state by bubbling the refrigerant liquid stored in the evaporator. With the bubbling method, the refrigerant in the wet steam state can be generated from the refrigerant liquid stored in the evaporator directly and efficiently.

In a fourth aspect of the present disclosure, the heat pump apparatus according to the second or the third aspect may further include a non-condensable gas return passage that connects a high pressure space at a discharge side of the compressor and a low pressure space at a suction side of the compressor with a path other than the main circuit, is used for the electrochemical compression, and causes non-condensable gas moved from the low pressure space to the high pressure space to return to the low pressure space from the high pressure space. The main circuit may include a refrigerant transport passage that transports the refrigerant from the condenser to the evaporator. The non-condensable gas return passage may include an outlet positioned lower than the liquid level of the refrigerant liquid stored in the evaporator and functions as the wet steam generator. When the non-condensable gas return passage is used as the wet steam generator, no additional parts will be required. Furthermore, energies for generating a refrigerant in a wet steam state can be saved.

In a fifth aspect of the present disclosure, the heat pump apparatus according to any one of the second to the fourth aspect may further include a circuit that includes a pump and a heat exchanger and circulates the refrigerant between the evaporator and the heat exchanger by the operation of the pump. The circuit may include an outlet positioned lower than the liquid level of the refrigerant liquid stored in the evaporator and functions as the wet steam generator. When the circuit is used as the wet steam generator, no additional parts will be required. Furthermore, energies for generating a refrigerant in a wet steam state can be saved.

In a sixth aspect of the present disclosure, the wet steam generator of the heat pump apparatus according to any one of the second to the fifth aspect may splash a droplet of the refrigerant by ruffling the liquid level of the refrigerant liquid stored in the evaporator. Ruffling the liquid level of the refrigerant liquid stored in the evaporator can cause a droplet of the refrigerant liquid (refrigerant mist) to be splashed in a space inside the evaporator.

In a seventh aspect of the present disclosure, the compressor of the heat pump apparatus according to any one of the first to the sixth aspect may compress the refrigerant to a superheated steam state from the wet steam state. According to the seventh aspect, compression work of the electrochemical compressor can be sufficiently reduced and the efficiency of the heat pump apparatus can be improved.

In an eighth aspect of the present disclosure, the heat pump apparatus according to the first aspect may further include a first detector that detects a temperature of the refrigerant after compressed by the compressor and before condensed by the condenser.

A heat pump apparatus using a conventional mechanical compressor allows a user to grasp the state of the refrigerant and the degree of superheating of the refrigerant at a suction port of the compressor by detecting an evaporating temperature of the refrigerant in the evaporator and a temperature of the refrigerant at the suction port of the compressor (suction temperature). Control of components such as an expansion valve is performed such that the degree of superheating falls within a desired numerical range, whereby the heat pump apparatus is operated in a desired refrigeration cycle. On the other hand, when a wet steam is supplied to the electrochemical compressor, the suction temperature coincides with the evaporating temperature. Even if the suction temperature and the evaporating temperature are detected, the state of the refrigerant at the suction port of the electrochemical compressor cannot be accurately grasped. It is thus hard to operate the heat pump apparatus in a desired refrigeration cycle.

By contrast, the heat pump apparatus according to the eighth aspect includes the first detector that detects a temperature of the refrigerant after compressed by the electrochemical compressor and before condensed by the condenser. More specifically, the first detector detects a temperature of the refrigerant at a discharge port of the electrochemical compressor (discharge temperature). With this configuration, the discharge temperature can be used for the control of the heat pump apparatus, whereby the controllability of the heat pump apparatus using an electrochemical compressor can be improved.

In a ninth aspect of the present disclosure, the heat pump apparatus according to the eighth aspect may further include a wet steam generator that generates the refrigerant in the wet steam state inside the evaporator and a controller that controls the wet steam generator based on the temperature detected by the first detector and the temperature of the refrigerant liquid stored in the condenser. According to the ninth aspect, a refrigerant steam having a sufficient wetness fraction can be supplied to the electrochemical compressor. More specifically, the heat pump apparatus can be operated such that wet compression is performed by the electrochemical compressor.

In a tenth aspect of the present disclosure, in the heat pump apparatus according to the ninth aspect, when the temperature detected by the first detector is defined as a first temperature and the temperature of the refrigerant liquid stored in the condenser is defined as a second temperature, the controller may control the wet steam generator to increase a wetness fraction of the refrigerant to be supplied to the compressor if a temperature difference between the first temperature and the second temperature is equal to or higher than a threshold and to decrease a wetness fraction of the refrigerant to be supplied to the compressor if the temperature difference is zero. According to the tenth aspect, a degree of superheating of the refrigerant at a high pressure side (the temperature difference between the first temperature and the second temperature) can be kept within an appropriate range. In other words, in the electrochemical compressor, the refrigerant is compressed to a superheated steam state having a degree of superheating lower than a threshold from a wet steam state. With this configuration, compression work of the electrochemical compressor can be sufficiently reduced and the efficiency of the heat pump apparatus can be improved.

In an eleventh aspect of the present disclosure, the heat pump apparatus according to the ninth or the tenth aspect may further include a second detector that is disposed lower than the liquid level of the refrigerant liquid stored in the condenser and detects the temperature of the refrigerant liquid. When the second detector is disposed in such a position, a saturation temperature of the refrigerant at a high pressure side of the refrigeration cycle can be accurately detected, whereby the degree of superheating can be accurately calculated. As a result, the control accuracy of the heat pump apparatus is improved. This further contributes to improvement in the efficiency of the heat pump apparatus.

In a twelfth aspect of the present disclosure, the heat pump apparatus according to the ninth or the tenth aspect may further include a second detector that detects a pressure inside the condenser. The controller may derive the temperature of the refrigerant liquid stored in the condenser based on the pressure detected by the second detector. Because the saturation temperature corresponds to the detected pressure, the temperature of the refrigerant liquid stored in the condenser can be derived based on the pressure detected by the second detector.

In a thirteenth aspect of the present disclosure, the heat pump apparatus according to the twelfth aspect provides a heat pump apparatus in which the second detector is disposed higher than the liquid level of the refrigerant liquid stored in the condenser. When a pressure in a space higher than the liquid level is detected, there is no need of considering contributions of the refrigerant liquid. The saturation temperature thus can be accurately detected.

In a fourteenth aspect of the present disclosure, the first detector of the heat pump apparatus according to any one of the eighth to the thirteenth aspect may be disposed in a position capable of detecting an attainment temperature of the refrigerant compressed by the compressor. When the first detector is disposed in such a position, the discharge temperature of the electrochemical compressor can be accurately detected, whereby the degree of superheating can be accurately calculated. As a result, the control accuracy of the heat pump apparatus is improved. This further contributes to improvement in the efficiency of the heat pump apparatus.

In a fifteenth aspect of the present disclosure, the first detector of the heat pump apparatus according to any one of the eighth to the thirteenth aspect may be disposed between the compressor and the condenser, at a discharge side of the compressor, in the main circuit.

In a sixteenth aspect of the present disclosure, the compressor of the heat pump apparatus according to any one of the eighth to the thirteenth aspect may include an electrolyte membrane, a first electrode disposed at a first major surface side of the electrolyte membrane and including a conductive base material and a catalyst supported by the conductive base material, and a second electrode including a conductive base material and a catalyst supported by the conductive base material.

In a seventeenth aspect of the present disclosure, the compressor of the heat pump apparatus according to the sixteenth aspect may apply voltage between the first electrode and the second electrode and permeate the refrigerant in the wet steam state supplied from the evaporator through the electrolyte membrane to change the permeated refrigerant to the refrigerant in a superheated steam state.

In an eighteenth aspect of the present disclosure, the refrigerant of the heat pump apparatus according to the eighth to the seventeenth aspect may be a refrigerant with a saturated steam pressure being negative at a normal temperature.

Hereinafter, an embodiment of the present disclosure will be described below with reference to the drawings. The present disclosure is not limited to the embodiment described below.

As illustrated in FIG. 1, a heat pump apparatus 100 according to the present embodiment includes a main circuit 2, a first circuit 4, a second circuit 6, and a non-condensable gas return passage 28. The both ends of the first circuit 4 are connected to the main circuit 2. The both ends of the second circuit 6 are also connected to the main circuit 2. In the main circuit 2, the first circuit 4, and the second circuit 6, a refrigerant and a non-condensable gas are filled as a working fluid. The refrigerant is a condensable fluid. The non-condensable gas is an electrochemically active gas and used for compressing the refrigerant in the main circuit 2.

In the present embodiment, a hydrogen gas is used as an electrochemically active non-condensable gas. The hydrogen gas and the refrigerant thus can be separated by utilizing a specific gravity difference therebetween. A polar material is used as the refrigerant. Specifically, a natural refrigerant such as water, alcohol, and ammonia can be used as the refrigerant. Use of a natural refrigerant is desirable in view of environmental protection such as protection of ozone layers and prevention of global warming. As examples of alcohol, a lower alcohol such as methanol and ethanol is considered. Water and alcohol are refrigerants with a saturated steam pressure being negative (pressure lower than the atmospheric pressure by absolute pressure) at a normal temperature (the Japanese Industrial Standards: 20° C.±15° C., JIS Z8703). When a refrigerant with a saturated steam pressure being negative at a normal temperature is used, under the operation of the heat pump apparatus 100, the pressure inside the heat pump apparatus 100 becomes lower than the atmospheric pressure. When ammonia is used as a refrigerant, the heat pump apparatus 100 can be operated under conditions where the pressures inside an evaporator 10 and a condenser 16 are higher than the atmospheric pressure, for example. With respect to the refrigerants described above, one type may be used singly or two or more types may be used in combination. An antifreeze may be included in a refrigerant for reasons such as freeze proofing. As an antifreeze, alcohol such as ethylene glycol and propylene glycol can be used. As a refrigerant including an antifreeze, a refrigerant mixture of water and alcohol is considered. Alcohol also can function as a refrigerant.

The main circuit 2 is a circuit that circulates a refrigerant and includes the evaporator 10, an electrochemical compressor 11, the condenser 16, and a refrigerant transport passage 18. The refrigerant passes through the evaporator 10, the electrochemical compressor 11, the condenser 16, and the refrigerant transport passage 18 in this order. The main circuit 2 may include a steam path (not illustrated) for supplying a refrigerant steam generated in the evaporator 10 to the condenser 16 while the refrigerant is compressed by the electrochemical compressor 11. In this case, the electrochemical compressor 11 is disposed on the steam path.

The electrochemical compressor 11 compresses the refrigerant evaporated in the evaporator 10 using an electrochemically active non-condensable gas. Specifically, the electrochemical compressor 11 includes an electrolyte membrane 13 (electrolyte layer), a first electrode 12, and a second electrode 14. That is to say the electrochemical compressor 11 has a structure of a membrane electrode assembly (MEA) used in a solid polymer fuel cell. The electrolyte membrane 13 is a perfluorosulfonic acid membrane such as Nafion® of Du Pont Co., for example. The first electrode 12 is disposed at a first major surface side of the electrolyte membrane 13.

The second electrode 14 is disposed at a second major surface side of the electrolyte membrane 13. Each of the first electrode 12 and the second electrode 14 is formed of a conductive base material such as a carbon cloth and a catalyst supported by the conductive base material. The catalyst may be a precious metal catalyst including a precious metal, for example. Each of the first electrode 12 and the second electrode 14 has a property of permeating a refrigerant molecule and a non-condensable gas molecule. The electrochemical compressor 11 applies voltage between the first electrode 12 and the second electrode 14 to permeate the refrigerant in a wet steam state supplied from the evaporator through the electrolyte membrane to change the permeated refrigerant to the refrigerant in the superheated steam state.

"An electrochemically active gas" herein refers to a gas having an ability to move from one surface to the other in the electrolyte membrane 13 with a polar material. "A non-condensable gas" refers to a gas of a material in a gas phase state under operating conditions reasonable for the heat pump apparatus 100 such as a temperature of −25° C. or higher and a pressure lower than 2 MPa.

The evaporator 10 is formed of a pressure resistant container having a heat insulating property, for example. To the evaporator 10, the upstream end and the downstream end of the first circuit 4 are connected. A refrigerant liquid stored in the evaporator 10 comes in direct contact with a refrigerant liquid heated by being circulated in the first circuit 4. More specifically, part of the refrigerant liquid stored in the evaporator 10 is heated in the first circuit 4 to be used as a heat source that heats the refrigerant liquid in a saturated state. The refrigerant liquid in a saturated state is heated, thereby generating a refrigerant steam.

In the inside of the evaporator 10, a small-sized container 26 is disposed, of which the top is opened. In the inside of the container 26, a porous filler 24 is disposed. The downstream end of the first circuit 4 extends toward the container 26 from the top of the evaporator 10 so as to spray the refrigerant liquid to the filler 24. The refrigerant liquid is sprayed to the filler 24 in the container 26, whereby the area of a gas-liquid boundary surface is increased. This can promote generation of the refrigerant steam. Part of the refrigerant liquid runs down from a pore formed at the bottom of the container 26 and stored in the evaporator 10. It should be noted that as long as effective generation of the refrigerant steam is achieved, the filler 24 and the container 26 are not essential.

The first circuit 4 is formed of a channel 30, a channel 31, a first pump 32, and a first heat exchanger 33. The channel 30 connects the bottom of the evaporator 10 and an inlet of the first heat exchanger 33. The channel 31 connects an outlet of the first heat exchanger 33 and the top of the evaporator 10. On the channel 30, the first pump 32 is disposed. The first heat exchanger 33 is formed of a publicly known heat exchanger such as a fin-tube heat exchanger. By the operation of the first pump 32, the refrigerant is circulated between the evaporator 10 and the first heat exchanger 33. When the heat pump apparatus 100 is an air conditioning apparatus, the first heat exchanger 33 is placed inside a room. When air conditioning is performed inside the room, a fan 34 supplies the air inside the room to the first heat exchanger 33 and the first heat exchanger 33 cools the air inside the room with the refrigerant liquid.

The first circuit 4 may be structured such that the refrigerant liquid stored in the evaporator 10 is not mixed with any other heating medium circulated in the first circuit 4. For example, when the evaporator 10 includes a heat exchanger structure as in a shell tube heat exchanger, the refrigerant liquid stored in the evaporator 10 can be heated to be evaporated by other heating medium circulated in the first circuit 4. In the first heat exchanger 33, other heating medium for heating the refrigerant liquid stored in the evaporator 10 runs. The other heating medium is not especially limited. As the other heating medium, water, brine, and the like can be used.

The condenser 16 is formed of a pressure resistant container having a heat insulating property, for example. To the condenser 16, the upstream end and the downstream end of the second circuit 6 are connected. The refrigerant steam compressed by the electrochemical compressor 11 comes in direct contact with the refrigerant liquid having been circulated in the second circuit 6 and thereby cooled. More specifically, part of the refrigerant liquid stored in the condenser 16 is cooled in the second circuit 6 to be used as a cooling heat source that cools the refrigerant steam. A high-temperature refrigerant liquid is generated with the refrigerant steam cooled.

In the inside of the condenser 16, a small-sized container 26 is disposed in which a porous filler 24 is disposed, as in the evaporator 10. The refrigerant liquid is sprayed to the filler 24 in the container 26, whereby the area of a gas-liquid boundary surface is increased. This can promote condensation of the refrigerant. Part of the refrigerant liquid runs down from a pore formed at the bottom of the container 26 and stored in the condenser 16. It should be noted that as long as effective condensation of the refrigerant steam is achieved, the filler 24 and the container 26 are not essential.

The second circuit 6 is formed of a channel 40, a channel 41, a second pump 42, and a second heat exchanger 43. The channel 40 connects the bottom of the condenser 16 and an inlet of the second heat exchanger 43. The channel 41 connects an outlet of the second heat exchanger 43 and the top of the condenser 16. On the channel 40, the second pump 42 is disposed. The second heat exchanger 43 is formed of a publicly known heat exchanger such as a fin-tube heat exchanger. By the operation of the second pump 42, the refrigerant is circulated between the condenser 16 and the second heat exchanger 43. When the heat pump apparatus 100 is an air conditioning apparatus, the second heat exchanger 43 is placed outside a room. When air conditioning is performed inside the room, a fan 44 supplies the air outside the room to the second heat exchanger 43 and the refrigerant liquid is cooled in the second heat exchanger 43 with the air outside the room.

As in the first circuit 4, the second circuit 6 may be structured that the refrigerant liquid stored in the condenser 16 is not mixed with any other heating medium circulated in the second circuit 6. For example, when the condenser 16 includes a heat exchanger structure as in a shell tube heat exchanger, the refrigerant steam supplied to the condenser 16 can be cooled to be condensed by other heating medium circulated in the second circuit 6. In the second heat exchanger 43, other heating medium for cooling the refrigerant steam supplied to the condenser 16 runs.

When the heat pump apparatus 100 is a chiller, a hot water heater, or a water-cooled condenser, the first heat exchanger 33 and/or the second heat exchanger 43 can be a liquid-liquid heat exchanger that causes heat exchange between a heating medium such as brine and water and the refrigerant.

In the present embodiment, the first circuit 4 is used to heat the refrigerant liquid stored in the evaporator 10, and the second circuit 6 is used to cool the refrigerant liquid stored in the condenser 16. The influence of the non-condensable gas in the heat exchangers 33 and 43 thus can be minimized with a system that forcibly circulates the refrigerant liquid in the first circuit 4 and the second circuit 6. However, as the heat exchangers 33 and 43, a normal heat exchanger evaporating a refrigerant inside a heat transfer tube and condensing the refrigerant inside the heat transfer tube may be used instead of the heat exchangers circulating the liquid refrigerant.

As illustrated in FIG. 1, the refrigerant transport passage 18 is a passage for transporting the refrigerant (more specifically, the refrigerant liquid) from the condenser 16 to the evaporator 10. The refrigerant transport passage 18 connects the bottom of the evaporator 10 and the bottom of the condenser 16. The refrigerant transport passage 18 may be provided with a capillary, an expansion valve of a variable opening, and the like.

The non-condensable gas return passage 28 is a passage different from the refrigerant transport passage 18 and is structured to connect a high pressure space at a discharge side of the electrochemical compressor 11 and a low pressure space at a suction side of the electrochemical compressor 11 so that the non-condensable gas is returned to the low pressure space from the high pressure space. Because the non-condensable gas is returned from the high pressure space to the low pressure space through the non-condensable gas return passage 28, the non-condensable gas as a working fluid for compressing the refrigerant can be prevented from running short. In other words, the amount of the non-condensable gas consumed (the amount of the non-condensable gas filled in the heat pump apparatus 100) can be reduced. Furthermore, the non-condensable gas causing inhibition of heat transfer can be controlled so as not to run into the heat exchangers 33 and 43, in which the refrigerant liquid is circulated, whereby the efficiency of the heat pump apparatus 100 can be enhanced. In the present embodiment, the non-condensable gas return passage 28 is directly connected to the condenser 16 and the evaporator 10, connecting the space inside the condenser 16 (high pressure space) and the space inside the evaporator 10 (low pressure space).

The non-condensable gas return passage 28 is provided with a gate 22 having an ability to maintain a pressure difference between the high pressure space and the low pressure space and an ability to return the non-condensable gas from the high pressure space to the low pressure space. With the pressure difference maintained between the high pressure space and the low pressure space, the operation of the heat pump apparatus 100 can be continued while the non-condensable gas is returned from the high pressure space to the low pressure space.

Specifically, a capillary, a flow regulating valve, or a switching valve can be used as the gate 22. An advantage of a capillary is that no special control is required. When a switching valve is used as the gate 22, the non-condensable gas accumulated in the high pressure space can be returned to the low pressure space with the switching valve opened periodically. During the period in which the switching valve is closed, the heat pump apparatus 100 can be efficiently operated because the refrigerant and the non-condensable gas cannot pass through the non-condensable gas return passage 28. An advantage of a flow regulating valve is that with the opening thereof changed, the flow rate of the non-condensable gas can be regulated in the non-condensable gas return passage 28. The type of the flow regulating valve and the switching valve can be an electric type, an air operation type, or a hydraulic operation type. In some cases, a flow regulating valve may be used for the same purpose as a switching valve. It should be noted that a combination of a plurality of components optionally selected from a capillary, a flow regulating valve, and a switching valve may be used as the gate 22. Furthermore, a plurality of components of the same type may be used as the gate 22.

If hydrogen is used as the non-condensable gas, a hydrogen permeable membrane having an ability to selectively permeate hydrogen can be used as the gate 22. As the hydrogen permeable membrane, a zeolite membrane and a palladium membrane (including a palladium alloy membrane) are known, for example. The palladium membrane selectively permeates hydrogen when sufficiently heated with a heater. Use of these hydrogen permeable membranes can securely prevent the refrigerant steam from returning from the high pressure space to the low pressure space through the non-condensable gas return passage 28.

The non-condensable gas return passage 28 has an end connected to the top of the condenser 16. In the condenser 16, the refrigerant is cooled and condensed. The non-condensable gas is easily accumulated in a space at the top of the condenser 16 due to the specific gravity difference. The non-condensable gas is thus easily forwarded from the space inside the condenser 16 (high pressure space) to the non-condensable gas return passage 28 when the non-condensable gas return passage 28 is connected to the top of the condenser 16.

The specific gravity of the non-condensable gas and the specific gravity of the refrigerant steam are compared with the values thereof inside the condenser 16 under the operation of the heat pump apparatus 100. Specifically, when the temperature inside the condenser 16 is a specific temperature and the non-condensable gas has an optional partial pressure inside the condenser 16, "the specific gravity of the non-condensable gas" can be calculated from the density of the non-condensable gas at that temperature and that partial pressure. Similarly, when the temperature inside the condenser 16 is a specific temperature, "the specific gravity of the refrigerant steam" can be calculated from the density of the refrigerant steam at the saturated steam pressure of the refrigerant at that temperature. "The specific temperature" refers to an optional temperature that is possible with the refrigerant inside the condenser 16 under the steady operation of the heat pump apparatus 100. The term "specific gravity" is used for expressing the ratio of the density of the non-condensable gas or the refrigerant steam with respect to the density of the air (a value at 0° C. and 1 atmospheric pressure), for example.

In the present embodiment, the positional relation among the electrochemical compressor 11, the condenser 16, and the evaporator 10 is defined such that the electrochemical compressor 11 is positioned higher in the vertical direction than the liquid level of the refrigerant retained in the condenser 16 and the liquid level of the refrigerant retained in the evaporator 10. According to this configuration, the electrochemical compressor 11 can easily suction the non-condensable gas.

In the present embodiment, the heat pump apparatus 100 is structured such that the refrigerant in a wet steam state is supplied from the evaporator 10 to the electrochemical compressor 11. Accordingly, what is called wet compression is performed in the electrochemical compressor 11. The electrochemical compressor 11 has no components such as a valve, there is no risk of component damage even when wet compression is performed. When dry compression is compared with wet compression, the theoretical efficiency of refrigeration cycle is relatively high with wet compression and relatively low with dry compression. Therefore, compression work required for compressing the refrigerant to a predetermined pressure can be reduced by performing wet compression using the electrochemical compressor 11. With this, the efficiency of the heat pump apparatus 100 can be improved.

Figure 2:
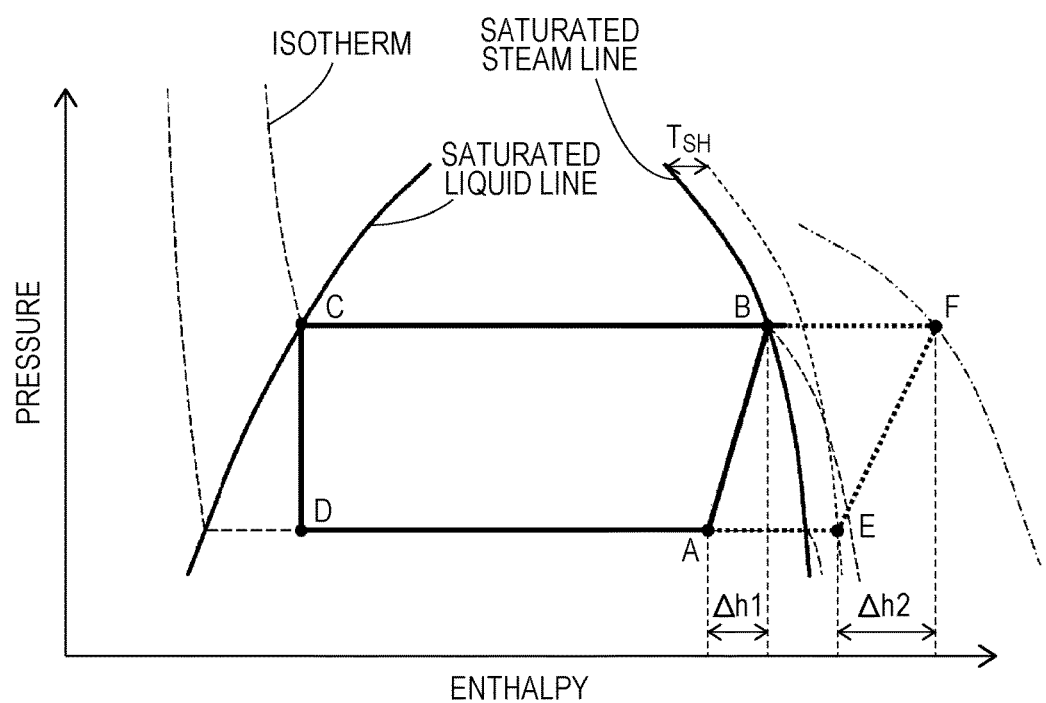
FIG. 2 is a p-h diagram for explaining reduction effect of compression work achieved by wet compression.

As illustrated in FIG. 2, the state of the refrigerant (temperature and pressure) in the heat pump apparatus 100 changes along a line connecting a point A, a point B, a point C, and a point D, for example. The compression process is represented by a line connecting the point A and the point B. At the start of the compression, the refrigerant is in a wet steam state (gas-liquid two-phase state) specified by the point A. In the electrochemical compressor 11, wet compression is performed, and the state of the refrigerant changes from the state specified by the point A to a state specified by the point B. In this compression process, compression work $\Delta h1$ is required.

On the other hand, the state of the refrigerant in a conventional heat pump apparatus performing dry compression changes along a point E, a point F, the point C, and the point D, for example. The compression process is represented by a line connecting the point E and the point F. At the start of the compression, the refrigerant is in a superheated steam (dry steam) state (in a superheated state) specified by the point E. In the compressor, dry compression is performed, and the state of the refrigerant changes from the state specified by the point E to a state specified by the point F. In this compression process, compression work $\Delta h2$ is required.

As known by the skilled person, a compression process proceeds along an isentrope theoretically. The inclination of the isentrope is relatively gentle at a high enthalpy side and relatively steep at a low enthalpy side. Therefore, the compression work $\Delta h1$ is smaller than the compression work $\Delta h2$. The compression work required for compressing the refrigerant to a predetermined pressure thus can be reduced according to the present embodiment. With this, the efficiency of the heat pump apparatus 100 can be improved.

Furthermore, the temperature at the point B is sufficiently lower than that at the point F. When water is used as the refrigerant, the temperature at the point B is 57° C. and the temperature at the point F is 280° C. According to the present embodiment, various influences of the heat, such as early deterioration of components of the electrochemical compressor 11 due to the heat, can be prevented. As a result, a highly-reliable heat pump apparatus 100 can be provided. Furthermore, the amount of a cooling heat required for lowering the temperature of the refrigerant from the point F to the point B can be reduced in the condenser 16. More specifically, compared with a case where dry compression is performed, the heat dissipation amount required for condensation is reduced, whereby downsizing of the condenser 16 and the heat exchanger 43 may be achieved.

To supply a refrigerant in a wet steam state to the electrochemical compressor 11 from the evaporator 10, the heat pump apparatus 100 is desirably provided with a wet steam generator that generates the refrigerant in a wet steam state in the evaporator 10. With the wet steam generator, a refrigerant steam having a sufficient wetness fraction can be generated. The type of the wet steam generator is not especially limited. In one example, the wet steam generator generates the refrigerant in the wet steam state by bubbling the refrigerant liquid stored in the evaporator 10. With the bubbling method, the refrigerant in the wet steam state can be generated from the refrigerant liquid stored directly and efficiently.

As illustrated in FIG. 1, in the present embodiment, the non-condensable gas return passage 28 functions as the wet steam generator. The non-condensable gas return passage 28 includes an outlet 28a positioned lower than the liquid level of the refrigerant liquid stored in the evaporator 10. In other words, a pipe forming the non-condensable gas return passage 28 extends into the refrigerant liquid. Furthermore, the non-condensable gas return passage 28 includes an inlet 28b that is opened toward the space inside the condenser 16. By the pressure difference between the outlet 28a and the inlet 28b, the non-condensable gas is returned from the condenser 16 to the evaporator 10 through the non-condensable gas return passage 28. At this time, the non-condensable gas bubbles the refrigerant liquid stored in the evaporator 10. With this, the mist-like refrigerant liquid (refrigerant mist) is splashed in the space inside the evaporator 10, and a gas-liquid two-phase refrigerant including a gas phase refrigerant and a liquid phase refrigerant is supplied to the electrochemical compressor 11. If the non-condensable gas return passage 28 is used as the wet steam generator, no additional parts will be required. Furthermore, energies for generating a refrigerant in a wet steam state can be saved.

If the amount of the non-condensable gas returned from the condenser 16 to the evaporator 10 through the non-condensable gas return passage 28 is regulated, the amount of the refrigerant mist generated by bubbling can be regulated. With this, the wetness fraction of the refrigerant steam to be supplied to the electrochemical compressor 11 can be regulated. With the wetness fraction of the refrigerant steam to be supplied to the electrochemical compressor 11 regulated, the compression process can be controlled, whereby the heat pump apparatus 100 can be operated in a desired refrigeration cycle.

To regulate the flow rate of the non-condensable gas in the non-condensable gas return passage 28, the gate 22 provided on the non-condensable gas return passage 28 desirably includes a flow regulating valve.

A conventional heat pump apparatus allows a user to grasp the state of the refrigerant and the degree of superheating of the refrigerant at a suction port of the compressor by detecting an evaporating temperature of the refrigerant in the evaporator and a temperature of the refrigerant at the suction port of the compressor (suction temperature). Control of components such as an expansion valve is performed such that the degree of superheating falls within a desired numerical range, whereby the heat pump apparatus is operated in a desired refrigeration cycle. On the other hand, when a refrigerant is supplied to the electrochemical compressor in a wet steam state, the suction temperature coincides with the evaporating temperature. Even if the suction temperature and the evaporating temperature are detected, the state of the refrigerant at the suction port of the electrochemical compressor cannot be accurately grasped. It is thus hard to operate the heat pump apparatus in a desired refrigeration cycle. To address this problem, the heat pump apparatus 100 according to the present embodiment is structured as described below.

As illustrated in FIG. 1, the heat pump apparatus 100 further includes a first detector 23, a second detector 25, and a controller 50. The first detector 23 is a detector that detects the temperature of the refrigerant after compressed by the electrochemical compressor 11 and before condensed by the condenser 16. The second detector 25 is a detector that detects the temperature of the refrigerant liquid stored in the condenser 16. In other words, the second detector 25 is a detector that detects the saturation temperature (condensation temperature) of the refrigerant at a high pressure side of the refrigeration cycle. The difference between the temperature detected by the first detector 23 and the temperature detected by the second detector 25 represents the degree of superheating of the refrigerant at the high pressure side of the refrigeration cycle. The wetness fraction of the refrigerant to be supplied to the electrochemical compressor 11 thus can be regulated based on the difference between these temperatures.

In the present embodiment, each of the detectors 23 and 25 is a temperature sensor. With the detectors 23 and 25, the temperature of the refrigerant and the degree of superheating of the refrigerant can be accurately detected in the positions where these detectors 23 and 25 are disposed. The first detector 23 is disposed in a position capable of detecting an attainment temperature of the refrigerant compressed by the electrochemical compressor 11. The first detector 23 is disposed in the vicinity of the electrode 14 (a position facing the electrode 14) at the discharge side of the electrochemical compressor 11, for example. Furthermore, the first detector 23 is disposed between the electrochemical compressor 11 and the condenser 16 at the discharge side of the electrochemical compressor 11 in the main circuit 2, for example. When the first detector 23 is disposed in such a position, the discharge temperature of the electrochemical compressor 11 can be accurately detected, whereby the degree of superheating can be accurately calculated. As a result, the control accuracy of the heat pump apparatus 100 is improved. This further contributes to improvement in the efficiency of the heat pump apparatus 100. In addition, the first detector 23 may be disposed inside the high pressure space at the discharge side of the compressor as long as the first detector 23 can detect the attainment temperature of the refrigerant compressed by the electrochemical compressor 11.

The second detector 25 is disposed lower than the liquid level of the refrigerant liquid stored in the condenser 16, for example. The second detector 25 is typically disposed in the vicinity of the bottom of the condenser 16. When the second detector 25 is disposed in such a position, the saturation temperature of the refrigerant at the high pressure side of the refrigeration cycle can be accurately detected, whereby the degree of superheating can be accurately calculated. As a result, the control accuracy of the heat pump apparatus 100 is improved. This further contributes to improvement in the efficiency of the heat pump apparatus 100. However, as long as the temperature of the refrigerant liquid stored in the condenser 16 can be detected, the position of the second detector 25 is not especially limited. For example, when the temperatures of the refrigerant liquid stored in the condenser 16 substantially coincides with that of the refrigerant liquid in the channel 40 in the second circuit 6, or when the temperatures of the refrigerant liquid stored in the condenser 16 can be estimated form that of the refrigerant liquid in the channel 40 in the second circuit 6, the second detector 25 may be disposed in a position capable of detecting the temperature of the refrigerant liquid in the channel 40.

Furthermore, the second detector 25 may be a detector that detects the pressure inside the condenser 16. More specifically, a pressure sensor can be used as the second detector 25. Because the saturation temperature corresponds to a detected pressure, based on the pressure detected by the second detector 25, the temperature of the refrigerant liquid stored in the condenser 16 can be derived. Even when the second detector 25 is a pressure sensor, the same result can be obtained as when the second detector 25 is a temperature sensor.

When the second detector 25 is a detector that detects the pressure inside the condenser 16, the second detector 25 is desirably disposed higher than the liquid level of the refrigerant liquid stored in the condenser 16. Specifically, the second detector 25 is desirably disposed higher than the lower end of the electrochemical compressor 11 in the vertical direction. For example, the second detector 25 may be disposed in the same position as the first detector 23. When the pressure is detected in the position illustrated in FIG. 1, contributions of the refrigerant liquid needs to be considered. By contrast, when a pressure in a space higher than the liquid level is detected, there is no need of considering contributions of the refrigerant liquid. The saturation temperature thus can be accurately detected.

The controller 50 is a digital signal processor (DSP) including an ND converter, an input/output circuit, an operation circuit, and a storage device, for example. To the controller 50, a signal is input from the first detector 23 and the second detector 25. The controller 50 controls the wet steam generator (the non-condensable gas return passage 28 in the present embodiment) based on detection results from the detector 23 and 25. The controller 50 may be a controller that controls components other than the wet steam generator such as the electrochemical compressor 11 and the second pump 42.

Next, the operation performed by the heat pump apparatus 100 will be described.

As illustrated in FIG. 1, the refrigerant steam compressed by the electrochemical compressor 11 is head-exchanged with a refrigerant liquid supercooled by the second heat exchanger 43 and thereby condensed in the condenser 16. Part of the refrigerant liquid condensed in the condenser 16 is transported to the evaporator 10 through the refrigerant transport passage 18. Part of the refrigerant liquid stored in the evaporator 10 is supplied to the first heat exchanger 33 through the first pump 32. The refrigerant liquid takes heat from the air in the room in the first heat exchanger 33, and then returns to the evaporator 10. The refrigerant liquid stored in the evaporator 10 is boiled under reduced pressure and thereby evaporated. The refrigerant steam generated in the evaporator 10 is suctioned into the electrochemical compressor 11. With this, indoor air cooling is performed, for example.

Figure 3:
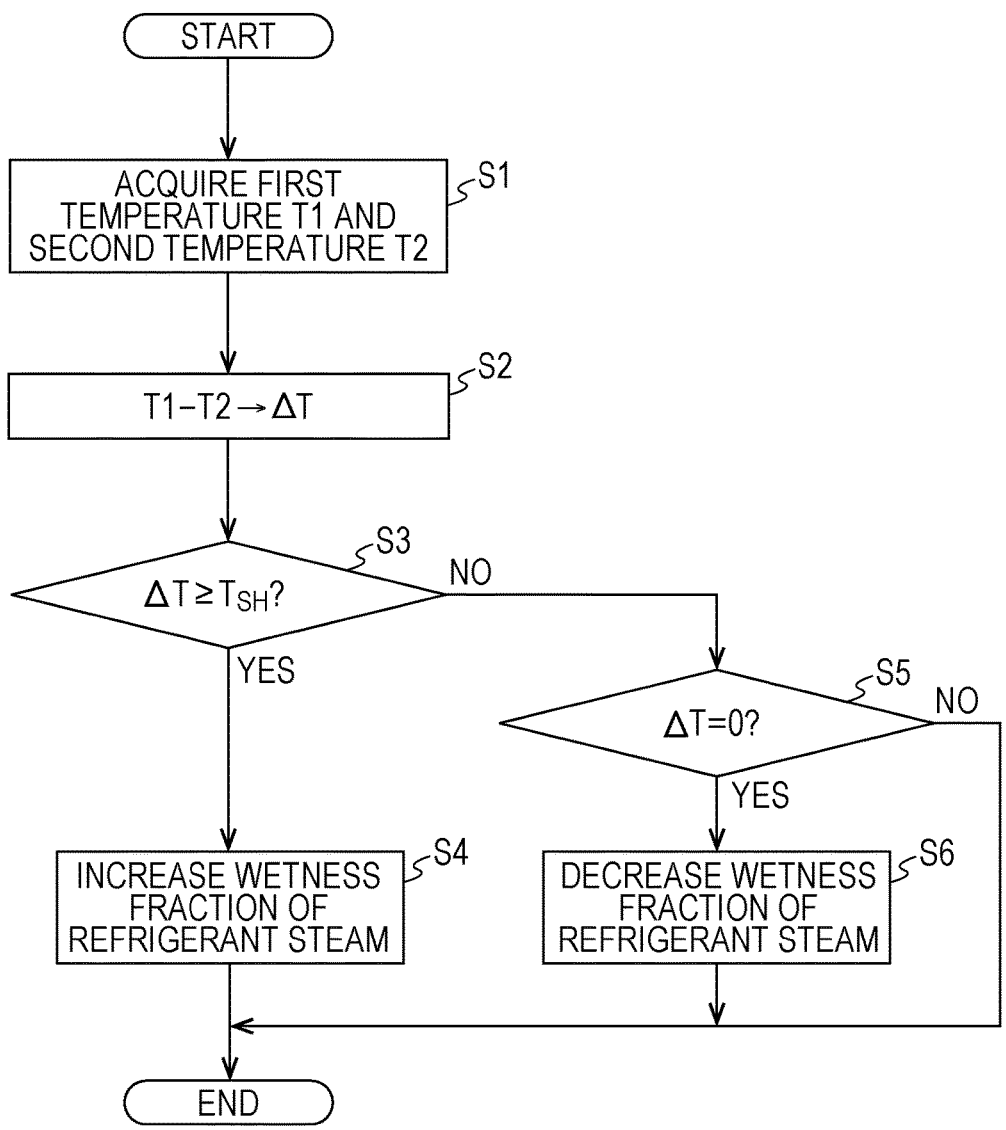
FIG. 3 is a flowchart illustrating control performed by the heat pump apparatus illustrated in FIG. 1 to generate a wet steam.

To generate a wet steam, the controller 50 periodically performs each processing in the flowchart in FIG. 3. The temperature of the refrigerant after compressed by the electrochemical compressor 11 and before condensed by the condenser 16 is defined as a first temperature T1, and the temperature of the refrigerant liquid stored in the condenser 16 is defined as a second temperature T2. The first temperature T1 is a temperature detected by the first detector 23. The second temperature T2 is a temperature detected by the second detector 25. Based on the first temperature T1 and the second temperature T2, the wet steam generator (non-condensable gas return passage 28 in the present embodiment) is controlled. With this, the refrigerant steam having a sufficient wetness fraction can be supplied to the electrochemical compressor 11.

Firstly, at step S1, the controller 50 acquires the first temperature T1 and the second temperature T2. Next, at step S2, a temperature difference ΔT between the first temperature T1 and the second temperature T2 is calculated. When the temperature difference ΔT is larger than zero, the temperature difference ΔT represents the degree of superheating of the refrigerant. Next, at step S3, it is determined whether the temperature difference ΔT is equal to or higher than a threshold $T_{SH}$.

Figure 4:
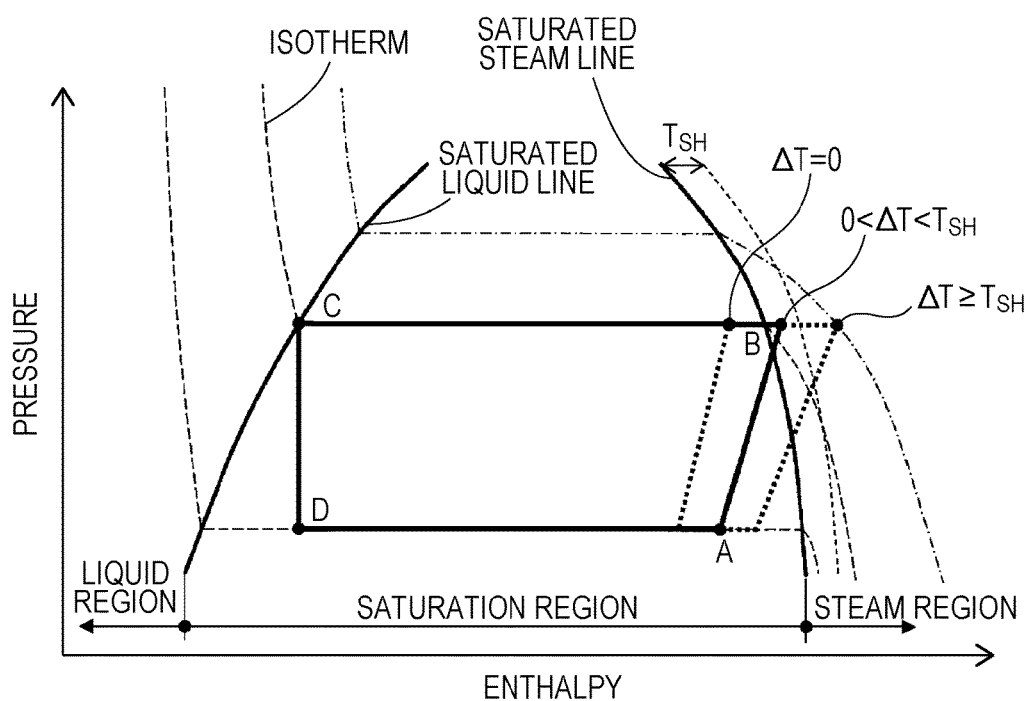
FIG. 4 is a p-h diagram illustrating change of the state of a refrigerant based on the control illustrated in the flowchart in FIG. 3.

As illustrated in FIG. 4, the threshold $T_{SH}$ represents an allowable range of degree of superheating. The threshold $T_{SH}$ is set in accordance with the type of the refrigerant, the application of the heat pump apparatus 100, and the like.

When the main component of the refrigerant is water, the threshold $T_{SH}$ is 20° C., for example.

When the temperature difference ΔT is equal to or higher than the threshold $T_{SH}$, at step S4, processing for increasing the wetness fraction of the refrigerant steam to be supplied to the electrochemical compressor 11 is performed. Specifically, the non-condensable gas return passage 28 (more specifically, the gate 22 of the return passage 28) serving as the wet steam generator is controlled to increase the wetness fraction of the refrigerant steam. When the gate 22 is a flow regulating valve, with the opening thereof increased, the flow rate of the non-condensable gas in the non-condensable gas return passage 28 is increased. As a result, the amount of the refrigerant mist generated by bubbling is increased, whereby the wetness fraction of the refrigerant steam is increased.

As illustrated in FIG. 4, even when the temperature difference ΔT is equal to or higher than the threshold $T_{SH}$, the refrigerant can be in a wet steam state at the suction port of the electrochemical compressor 11. Furthermore, the state (temperature and pressure) of the refrigerant at the suction port and the discharge port of the electrochemical compressor 11 can be identified. Accordingly, there is no problem in controlling the refrigerant cycle. However, as described with reference to FIG. 2, it is desirable that the heat pump apparatus 100 be controlled such that the degree of superheating (temperature difference ΔT) of the refrigerant at the high pressure side falls within an appropriate range to sufficiently reduce compression work.

On the other hand, when the temperature difference ΔT is lower than the threshold $T_{SH}$, at step S5, it is determined whether the temperature difference ΔT is zero. When the temperature difference ΔT is not zero, the temperature difference ΔT is larger than zero and smaller than the threshold $T_{SH}$. In other words, the degree of superheating of the refrigerant at the high pressure side is appropriate. When the temperature difference ΔT is zero, processing for reducing the wetness fraction of the refrigerant steam to be supplied to the electrochemical compressor 11 is performed. Specifically, the opening of the flow regulating valve provided on the non-condensable gas return passage 28 as the gate 22 is reduced. With this, the flow rate of the non-condensable gas in the non-condensable gas return passage 28 is reduced. As a result, the amount of the refrigerant mist generated by bubbling is reduced, whereby the wetness fraction of the refrigerant steam is reduced.

Under the control illustrated in FIG. 3, the heat pump apparatus 100 is operated based on the state of the refrigerant at the discharge port of the electrochemical compressor 11. Even if the state of the refrigerant at the suction port of the electrochemical compressor 11 is in a wet steam state, the heat pump apparatus 100 can be operated in a desired refrigeration cycle. In other words, under the control illustrated in FIG. 3, the controllability of the heat pump apparatus 100 is improved. The state of the refrigerant at the discharge port of the electrochemical compressor 11 is controlled, whereby the state of the refrigerant at the suction port of the electrochemical compressor 11 can be maintained in an ideal wet steam state.

Under the control illustrated in FIG. 3, the degree of superheating (temperature difference ΔT) at the high pressure side can be kept within an appropriate range. In other words, in the electrochemical compressor 11, the refrigerant is compressed to a superheated steam state having a degree of superheating lower than the threshold $T_{SH}$ from the wet steam state. With this configuration, compression work of the electrochemical compressor 11 can be sufficiently reduced and the efficiency of the heat pump apparatus 100 can be improved.

As illustrated in FIG. 1, when the first circuit 4 and the second circuit 6 are connected to the evaporator 10 and the condenser 16 respectively, the first circuit 4 and the second circuit 6 function as a heat absorbing circuit heating the refrigerant and a heat dissipation circuit cooling the refrigerant respectively. On the other hand, with the polarity of the voltage applied to the electrochemical compressor 11 switched, the evaporator 10 and the condenser 16 are mutually switched. In this case, the first circuit 4 and the second circuit 6 function as a heat dissipation circuit cooling the refrigerant and a heat absorbing circuit heating the refrigerant respectively. When the positions of the outlet 28a and the inlet 28b (one end and the other) of the non-condensable gas return passage 28 are appropriately set with respect to the liquid level of the refrigerant liquid, the non-condensable gas return passage 28 can be used as the wet steam generator even if cooling and heating are mutually switched with the polarity of the voltage applied to the electrochemical compressor 11 switched.

Hereinafter, some variations of the heat pump apparatus will be described. The components according to each variation that are in common with the heat pump apparatus 100 illustrated in FIG. 1 are denoted by the same reference characters, to avoid redundant description. In other words, description of the heat pump apparatus 100 can be applied to the variations described below as long as no technical contradiction is present.

(Variation 1)

Figure 5:
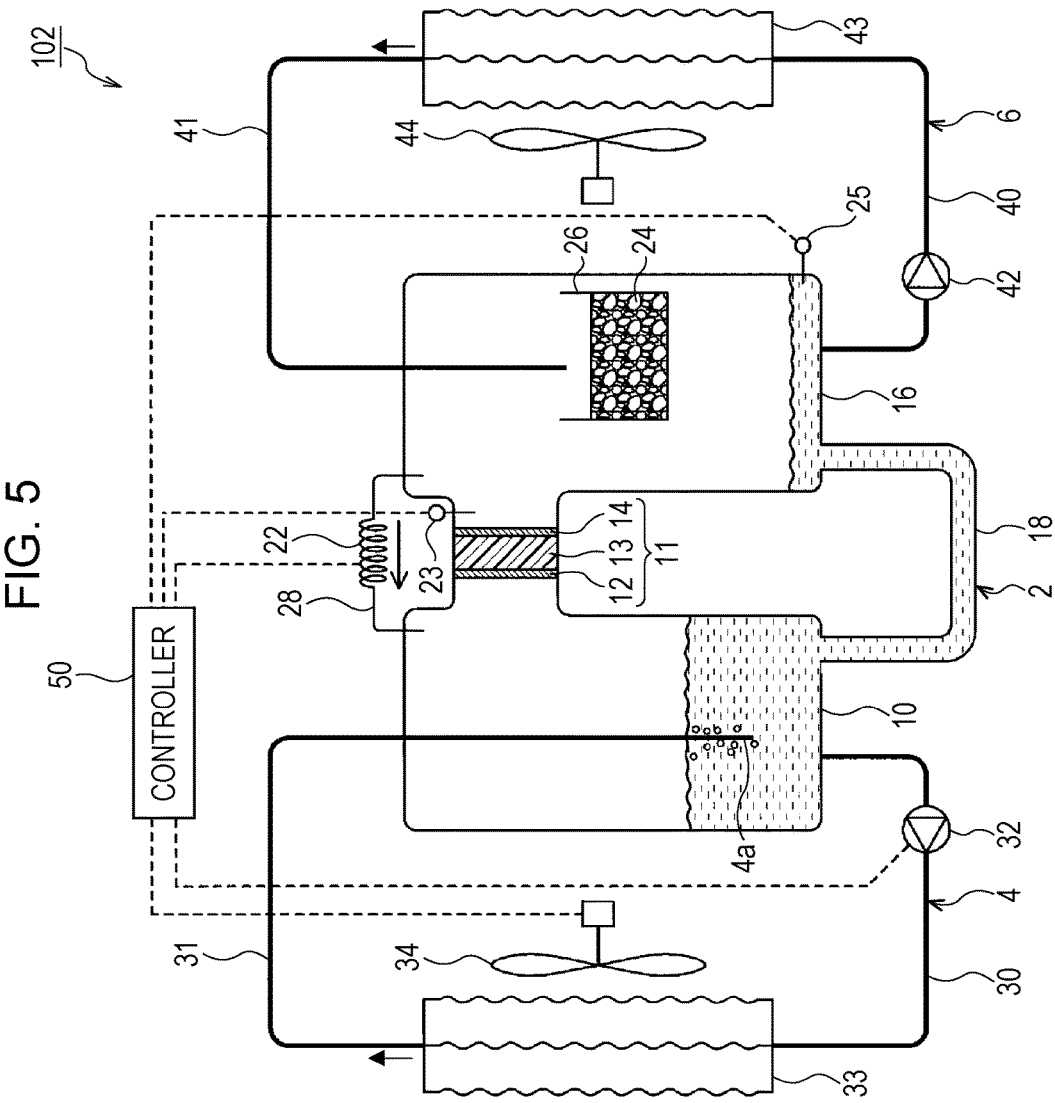
FIG. 5 is a block diagram of a heat pump apparatus according to variation 1.

As illustrated in FIG. 5, in a heat pump apparatus 102 according to the present variation, the first circuit 4 is used as a wet steam generator. The first circuit 4 includes an outlet 4a positioned lower than the liquid level of the refrigerant liquid stored in the evaporator 10. In other words, a pipe forming the first circuit 4 extends into the refrigerant liquid. When part of the refrigerant is vaporized in the first heat exchanger 33, the refrigerant liquid can be bubbled with the refrigerant in a gas phase. If the first circuit 4 is used as a wet steam generator, no additional part will be required. Furthermore, energies for generating a refrigerant steam in a wet steam state can be saved.

In the present variation, the wetness fraction of the refrigerant steam can be regulated by controlling the pump 32 of the first circuit 4 and/or the fan 34 for sending an air to the first heat exchanger 33. When the wetness fraction of the refrigerant steam needs to be increased, the rotation number of the pump 32 is increased and/or the rotation number of the fan 34 is decreased. When the rotation number of the pump 32 is increased, the intensity of the bubbling is increased and the generation amount of the refrigerant mist is also increased. When the rotation number of the fan 34 is decreased, the amount of the refrigerant vaporized in the first heat exchanger 33 is decreased. In this case, because the bubbling is performed with a gas-liquid two-phase refrigerant having a relatively large wetness fraction, the generation amount of the refrigerant mist is increased. On the other hand, when the wetness fraction of the refrigerant steam needs to be decreased, the rotation number of the pump 32 is decreased and/or the rotation number of the fan 34 is increased. When the rotation number of the pump 32 is decreased, the intensity of the bubbling is decreased and the generation amount of the refrigerant mist is also decreased. When the rotation number of the fan 34 is increased, the amount of the refrigerant vaporized in the first heat exchanger 33 is increased. In this case, because the bubbling is performed with a gas-liquid two-phase refrigerant having a relatively small wetness fraction, the generation amount of the refrigerant mist is decreased.

(Variation 2)

Figure 6:
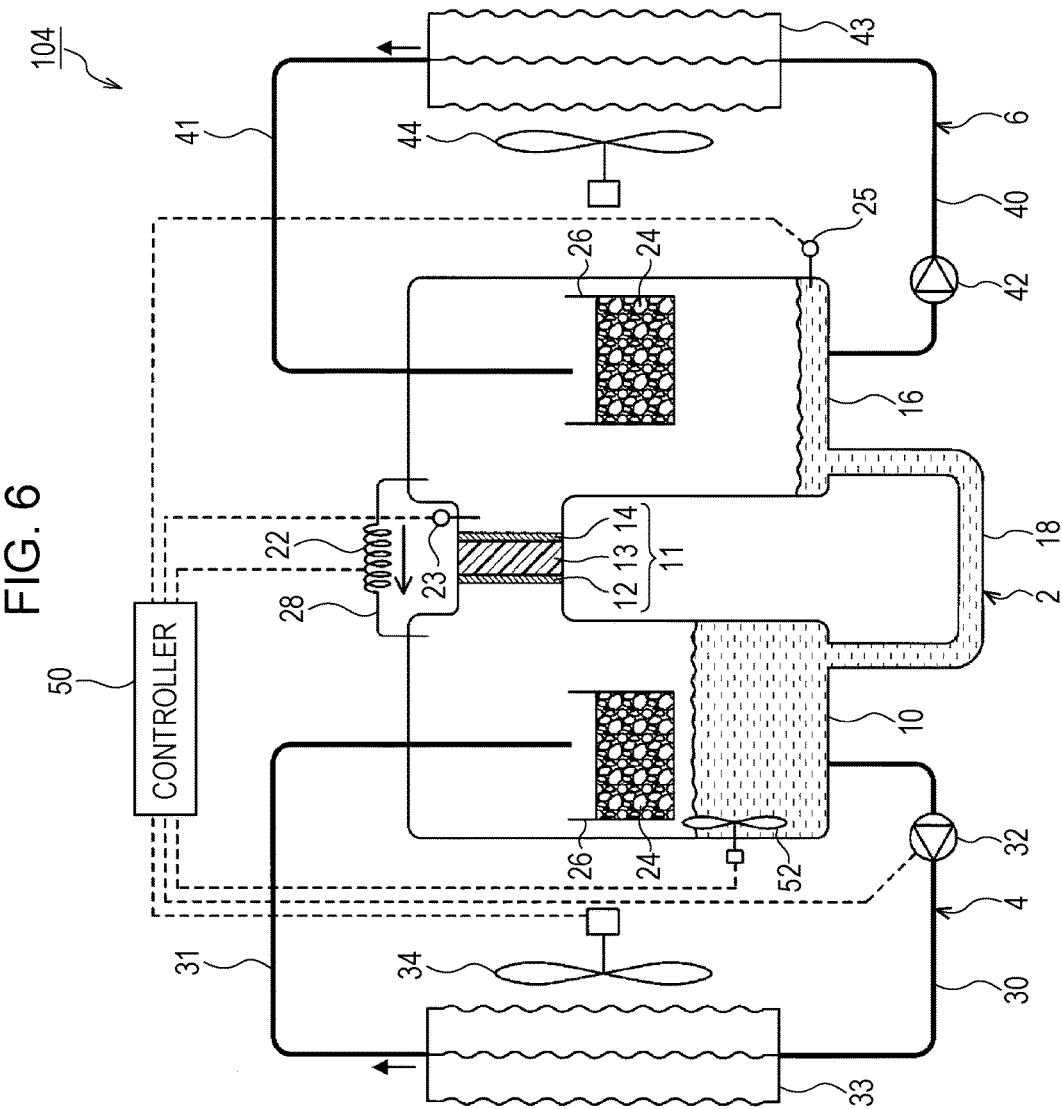
FIG. 6 is a block diagram of a heat pump apparatus according to variation 2.

As illustrated in FIG. 6, a heat pump apparatus 104 according to the present variation further includes a ruffling device 52 that ruffles the liquid level of the refrigerant liquid stored in the evaporator 10 as a wet steam generator. By ruffling (agitating) the liquid level of the refrigerant liquid stored in the evaporator 10, a droplet of the refrigerant liquid (refrigerant mist) can be splashed in the space inside the evaporator 10. In the present embodiment, as the ruffling device 52, a screw 52 is used. Part of the screw 52 is lower than the liquid level and the remaining part of the screw 52 is higher than the liquid level. However, the ruffling device 52 is not limited to the screw 52 and may be any device that can ruffle the liquid level of the refrigerant liquid. For example, a vibrator vibrating the liquid level, such as an ultrasonic vibrator, can be used as the ruffling device 52.

The wetness fraction of the refrigerant steam can be regulated by controlling the ruffling device 52. When the wetness fraction of the refrigerant steam needs to be increased, the ruffling device 52 is controlled such that the amount of the refrigerant mist splashed into the space inside the evaporator 10 is increased. In the present variation, the rotation number of the screw 52 is increased. When the wetness fraction of the refrigerant steam needs to be decreased, the ruffling device 52 is controlled such that the amount of the refrigerant mist splashed into the space inside the evaporator 10 is decreased. Specifically, the rotation number of the screw 52 is decreased.

In the present variation, the non-condensable gas return passage 28 includes an end that is opened toward the space at the top of the condenser 16 and the other end that is opened toward the space at the top of the evaporator 10. In this case, cooling and heating can be easily switched. More specifically, no special structure is required for switching between cooling and heating. With the polarity of the voltage applied to the electrochemical compressor 11 switched, the evaporator 10 and the condenser 16 are mutually switched. With this, cooling and heating can be easily switched. The ruffling device 52 may be also provided inside the condenser 16.

(Variation 3)

Figure 7:
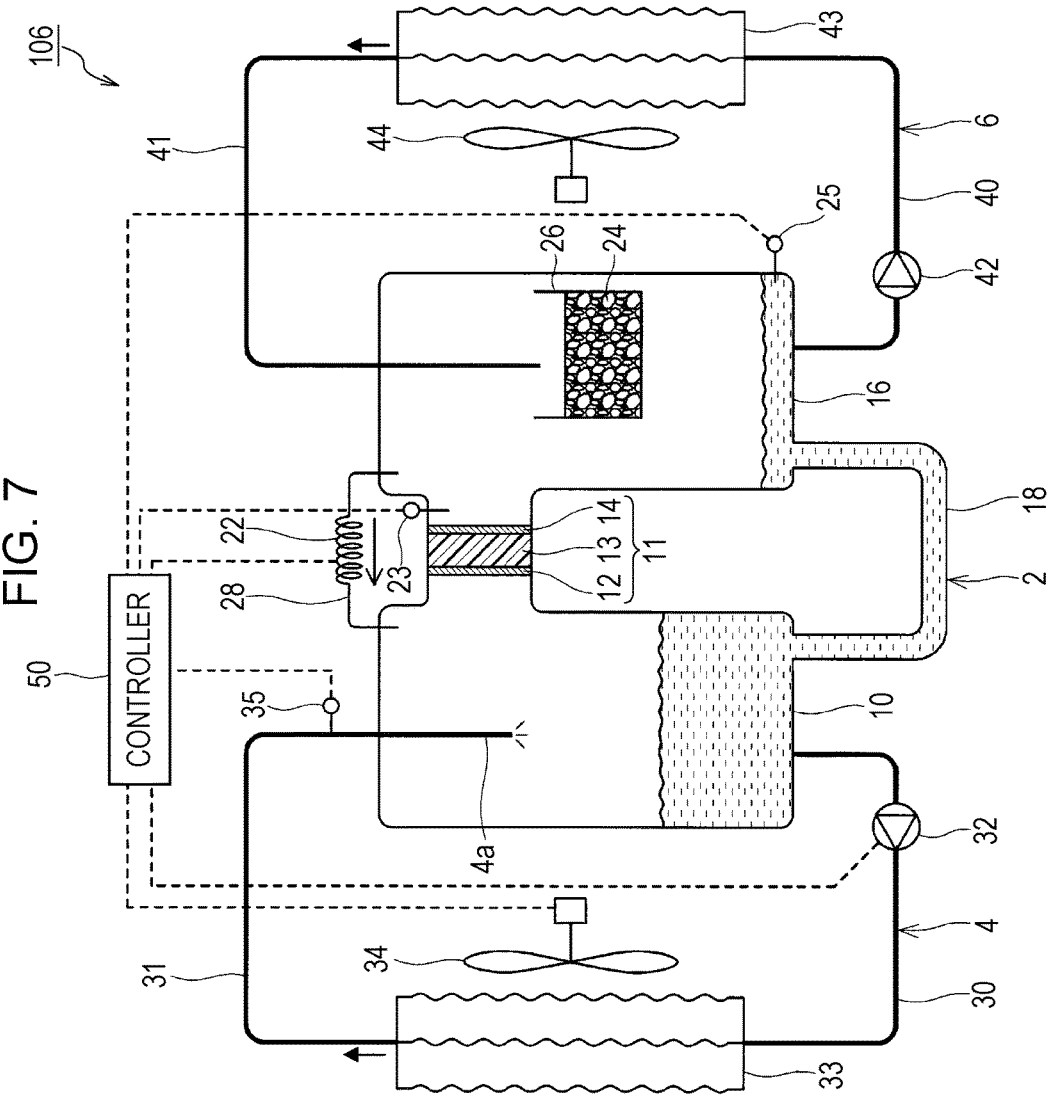
FIG. 7 is a block diagram of a heat pump apparatus according to variation 3.

As illustrated in FIG. 7, in a heat pump apparatus 106 according to the present variation, the first circuit 4 is used as a wet steam generator. However, in the present variation, the outlet 4a of the first circuit 4 is positioned higher than the liquid level of the refrigerant liquid stored in the evaporator 10. In other words, an end of the pipe forming the channel 31 is positioned higher than the liquid level of the refrigerant liquid. The first circuit 4 is structured such that part of the refrigerant is vaporized in the first heat exchanger 33 and a gas-liquid two-phase refrigerant is returned to the evaporator 10 from the first heat exchanger 33. Specifically, the size of the first heat exchanger 33, the circulation amount (mass flow) of the refrigerant in the first circuit 4, and the like are defined such that a gas-liquid two-phase refrigerant is returned to the evaporator 10 from the first heat exchanger 33. Toward the space inside the evaporator 10, the gas-liquid two-phase refrigerant is splashed from the outlet 4a of the first circuit 4, whereby the refrigerant steam in a wet steam state can be supplied to the electrochemical compressor 11. When the first circuit 4 is used as a wet steam generator, no additional parts will be required. Furthermore, energies for generating a refrigerant steam in a wet steam state can be saved.

The heat pump apparatus 106 according to the present variation further includes a third detector 35. The third detector 35 is a detector that detects the temperature and the pressure of the refrigerant in the channel 31. The third detector 35 typically includes a temperature sensor and a pressure sensor. If the temperature and the pressure of the refrigerant in the channel 31 are detected, the state of the refrigerant can be determined, whether the refrigerant is in a cooling state, in a gas-liquid two-phase state, or in a superheated state. When the detected temperature is lower than the saturation temperature corresponding to the detected pressure, the refrigerant is in a supercooled state. When the detected temperature is equal to the saturation temperature corresponding to the detected pressure, the refrigerant is in a gas-liquid two-phase state. When the detected temperature is higher than the saturation temperature corresponding to the detected pressure, the refrigerant is in a superheated state. Accordingly, when the wetness fraction of the refrigerant steam needs to be increased or when the wetness fraction of the refrigerant steam needs to be decreased, necessary processing should be performed in accordance with the state of the refrigerant in the channel 31.

For example, it is assumed that the refrigerant is in a gas-liquid two-phase state in the channel 31. When the wetness fraction of the refrigerant steam to be supplied to the electrochemical compressor 11 needs to be increased, the rotation number of the pump 32 is increased and/or the rotation number of the fan 34 is decreased. Because this increases the wetness fraction of the refrigerant in the channel 31, the rate of the refrigerant liquid included in the refrigerant splashed from the outlet 4a is increased. As a result, the wetness fraction of the refrigerant steam supplied to the electrochemical compressor 11 is also increased. On the other hand, when the wetness fraction of the refrigerant steam to be supplied to the electrochemical compressor 11 needs to be decreased, the rotation number of the pump 32 is decreased and/or the rotation number of the fan 34 is increased. Because this decreases the wetness fraction of the refrigerant in the channel 31, the rate of the refrigerant liquid included in the refrigerant splashed from the outlet 4a is decreased. As a result, the wetness fraction of the refrigerant steam supplied to the electrochemical compressor 11 is also decreased.

(Variation 4)

Figure 8:
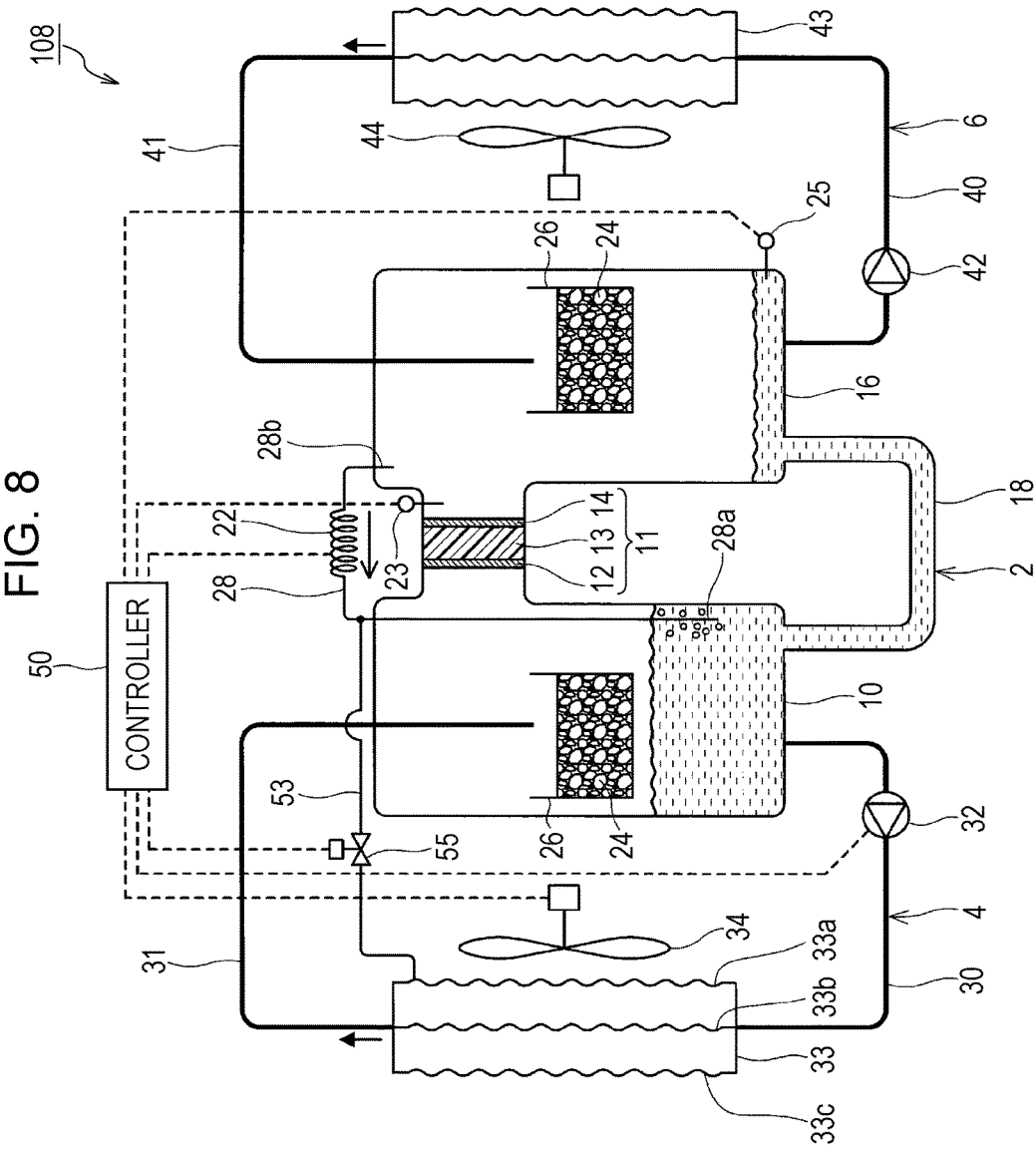
FIG. 8 is a block diagram of a heat pump apparatus according to variation 4.

As illustrated in FIG. 8, a heat pump apparatus 108 according to the present variation further includes a bypass passage 53. The bypass passage 53 is provided with a valve 55. The valve 55 may be a switching valve or a flow regulating valve. One end (inlet) and the other end (outlet) of the bypass passage 53 are connected to the first heat exchanger 33 and the non-condensable gas return passage 28 respectively. More specifically, the first heat exchanger 33 includes a plurality of branch channels 33a, 33b, and 33c. One end of the bypass passage 53 is connected to a downstream part of the branch channel 33a, which is positioned on the most windward side with respect to the fan 34. The branch channel 33a is a part in which heat exchange is performed the most efficiently in the first heat exchanger 33. In the branch channel 33a, the refrigerant is sufficiently heated to a gas-liquid two-phase state or a superheated state in which the dryness fraction is large. The refrigerant is taken out from the branch channel 33a of the first heat exchanger 33 and supplied to a part on the downstream side from the gate 22 in the non-condensable gas return passage 28 through the bypass passage 53. The refrigerant supplied to the non-condensable gas return passage 28 can be used for bubbling. With the valve 55 opened and closed or with the opening of the valve 55 changed, the intensity of the bubbling can be changed. In other words, according to the present variation, control of the gate 22 is not essential for changing the intensity of the bubbling. The density of the non-condensable gas inside the evaporator 10 thus can be easily kept at an optimal value. It should be noted that the outlet of the bypass passage 53 may be positioned lower than the liquid level of the refrigerant liquid.

(Variation 5)

Figure 9:
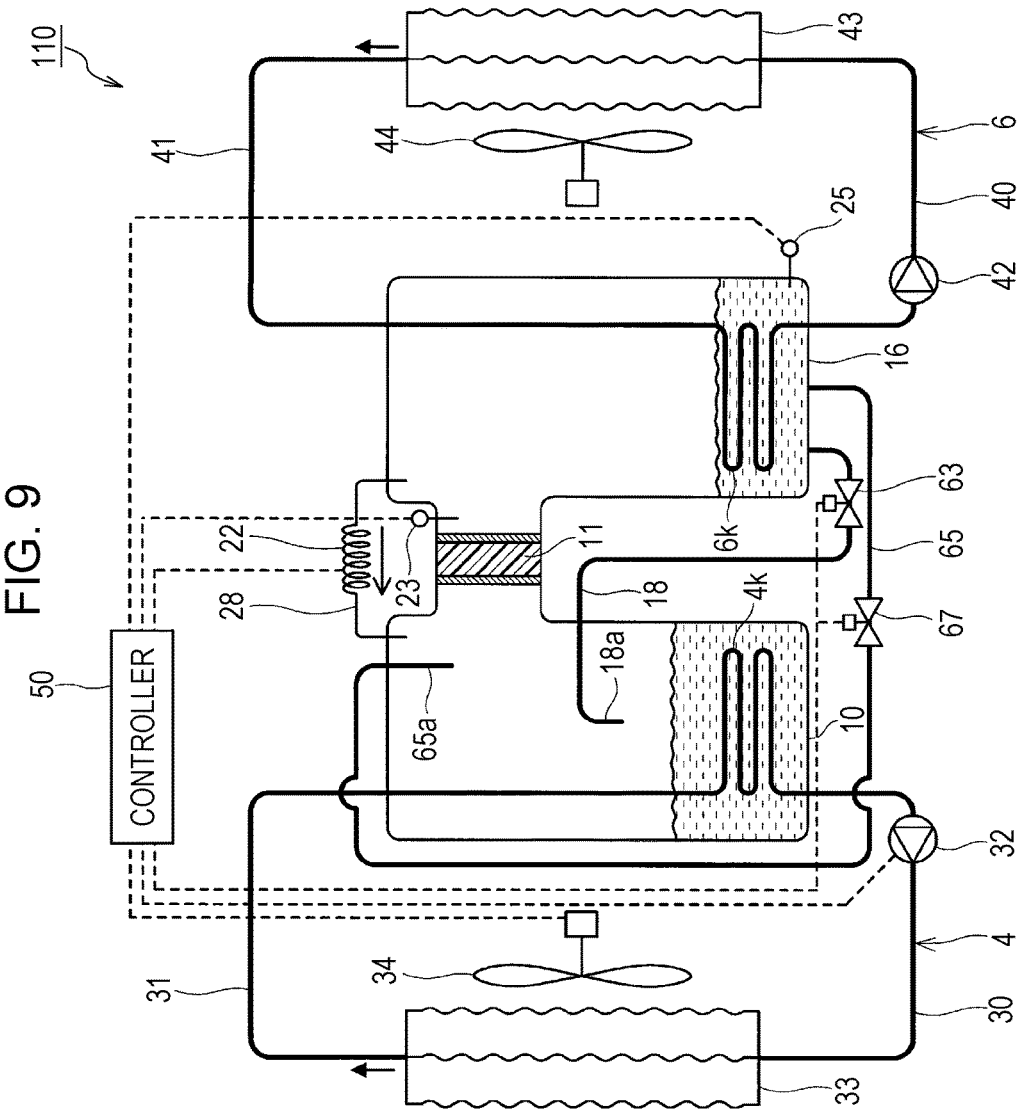
FIG. 9 is a block diagram of a heat pump apparatus according to variation 5.

As illustrated in FIG. 9, a heat pump apparatus 110 according to the present variation is structured such that a heating medium different from the refrigerant filled in the main circuit 2 is circulated in the first circuit 4 and the second circuit 6. In other words, the first circuit 4 and the second circuit 6 are separated from the main circuit 2. The first circuit 4 and the second circuit 6 include heat exchange units 4k and 6k respectively. The heat exchange unit 4k is disposed inside the evaporator 10. The heat exchange unit 6k is disposed inside the condenser 16. In the heat exchange unit 4k, the heating medium running in the first circuit 4 and the refrigerant liquid stored in the evaporator 10 are heat-exchanged. In the heat exchange unit 6k, the heating medium running in the second circuit 6 and the refrigerant liquid stored in the condenser 16 are heat-exchanged.

In the heat pump apparatus 110 according to the present variation, the refrigerant transport passage 18 is used as a wet steam generator. In the present variation, the outlet 18a of the refrigerant transport passage 18 is positioned higher than the liquid level of the refrigerant liquid stored in the evaporator 10. More specifically, an end of the pipe forming the refrigerant transport passage 18 is positioned higher than the liquid level of the refrigerant liquid. Furthermore, the refrigerant transport passage 18 is provided with an expansion valve 63 of a variable opening. The refrigerant is decompressed at the expansion valve 63 to change from a liquid phase state to a gas-liquid two-phase state. A refrigerant in a gas-liquid two-phase state is thus supplied from the condenser 16 to the evaporator 10. Toward the space inside the evaporator 10, the refrigerant in a gas-liquid two-phase state is splashed from the outlet 18a of the refrigerant transport passage 18, whereby the refrigerant in a wet steam state can be supplied to the electrochemical compressor 11. If the refrigerant transport passage 18 is used as a wet steam generator, no additional parts will be required. Furthermore, energies for generating a refrigerant in a wet steam state can be saved.

The heat pump apparatus 110 further includes a humidification passage 65 that functions as a wet steam generator. One end (inlet) of the humidification passage 65 is connected to the condenser 16 (more specifically, the bottom of the condenser 16). The other end (outlet 65a) of the humidification passage 65 is positioned higher than the liquid level of the refrigerant liquid stored in the evaporator 10. In other words, an end of the pipe forming the humidification passage 65 is positioned higher than the liquid level of the refrigerant liquid. Specifically, the outlet 65a of the humidification passage 65 is positioned in the vicinity of the suction port of the electrochemical compressor 11. Furthermore, the humidification passage 65 is provided with a humidification valve 67 (expansion valve) of a variable opening. The refrigerant is decompressed at the humidification valve 67 to change from a liquid phase state to a gas-liquid two-phase state. A refrigerant in a gas-liquid two-phase state is thus supplied from the condenser 16 to the evaporator 10. Toward the vicinity of the suction port of the electrochemical compressor 11, the refrigerant in a gas-liquid two-phase state is splashed from the outlet 65a of the humidification passage 65, whereby the refrigerant in a wet steam state can be supplied to the electrochemical compressor 11 efficiently.

When the wetness fraction of the refrigerant steam to be supplied to the electrochemical compressor 11 needs to be increased in the heat pump apparatus 110, the opening of either one selected from the expansion valve 63 or the humidification valve 67 is increased. When the wetness fraction of the refrigerant steam to be supplied to the electrochemical compressor 11 needs to be decreased, the opening of either one selected from the expansion valve 63 or the humidification valve 67 is decreased.

(Other)

Each of the wet steam generators in the heat pump apparatuses 100 to 110 described herein can be employed in other of the heat pump apparatuses 100 to 110. For example, the screw 52 in the heat pump apparatus 104 described with reference to FIG. 6 can be easily added to other heat pump apparatuses 100, 102, 106, 108, and 110. Furthermore, the configuration of the first circuit 4 and the second circuit 6 in the heat pump apparatus 110 described with reference to FIG. 9 can be employed in other heat pump apparatuses 100 to 108. As described above, the configurations of the heat pump apparatuses 100 to 110 can be mutually combined.

The heat pump apparatuses described herein can be widely utilized in a chiller, an air conditioning apparatus, a hot water heater, and the like.

What is claimed is:

1. A heat pump apparatus comprising:
    a main circuit that includes:
        an evaporator that evaporates a refrigerant in a liquid phase and generates the refrigerant in a wet steam state;
        a compressor that compresses the refrigerant in the wet steam state with electrochemical compression; and
        a condenser that condenses the compressed refrigerant, wherein:
    the evaporator includes a wet steam generator that generates the refrigerant in the wet steam state, and
    the wet steam generator generates the refrigerant in the wet steam state by bubbling the refrigerant in the liquid phase stored in the evaporator.

2. The heat pump apparatus according to claim 1, further comprising:
    a non-condensable gas return passage that connects a high pressure space at a discharge side of the compressor and a low pressure space at a suction side of the compressor with a path other than the main circuit, is used for the electrochemical compression, and causes non-condensable gas moved from the low pressure space to the high pressure space to return to the low pressure space from the high pressure space, wherein
    the main circuit includes a refrigerant transport passage that transports the refrigerant from the condenser to the evaporator, and
    the non-condensable gas return passage includes an outlet positioned lower than the liquid level of the refrigerant in the liquid phase stored in the evaporator and functions as the wet steam generator.

3. The heat pump apparatus according to claim 1, further comprising:
    a circuit that includes a pump and a heat exchanger and circulates the refrigerant between the evaporator and the heat exchanger by the operation of the pump, wherein the circuit includes an outlet positioned lower than the liquid level of the refrigerant in the liquid phase stored in the evaporator and functions as the wet steam generator.

4. The heat pump apparatus according to claim 1, wherein the wet steam generator splashes a droplet of the refrigerant by ruffling the liquid level of the refrigerant in the liquid phase stored in the evaporator.

5. The heat pump apparatus according to claim 1, wherein the compressor compresses the refrigerant to a superheated steam state from the wet steam state.

6. The heat pump apparatus according to claim 1, further comprising:
a first detector that detects a temperature of the refrigerant after compressed by the compressor and before condensed by the condenser.

7. The heat pump apparatus according to claim 6, wherein the first detector is disposed in a position capable of detecting an attainment temperature of the refrigerant compressed by the compressor.

8. The heat pump apparatus according to claim 6, wherein the first detector is disposed between the compressor and the condenser, at a discharge side of the compressor, in the main circuit.

9. The heat pump apparatus according to claim 1, wherein the compressor includes
an electrolyte membrane,
a first electrode disposed at a first major surface side of the electrolyte membrane and including a conductive base material and a catalyst supported by the conductive base material, and
a second electrode including a conductive base material and a catalyst supported by the conductive base material.

10. The heat pump apparatus according to claim 9, wherein the compressor applies voltage between the first electrode and the second electrode and permeates the refrigerant in the wet steam state supplied from the evaporator through the electrolyte membrane to change the permeated refrigerant to the refrigerant in a superheated steam state.

11. The heat pump apparatus according to claim 1, wherein the refrigerant is a refrigerant with a saturated steam pressure being negative at a normal temperature.

12. A heat pump apparatus comprising:
a main circuit that includes:
an evaporator that evaporates a refrigerant in a liquid phase and generates the refrigerant in a wet steam state;
a compressor that compresses the refrigerant in the wet steam state with electrochemical compression; and
a condenser that condenses the compressed refrigerant;
a first detector that detects a temperature of the refrigerant after compressed by the compressor and before condensed by the condenser;
a wet steam generator that generates the refrigerant in the wet steam state inside the evaporator; and
a controller that controls the wet steam generator based on the temperature detected by the first detector and the temperature of the refrigerant in the liquid phase stored in the condenser.

13. The heat pump apparatus according to claim 12, wherein
when the temperature detected by the first detector is defined as a first temperature and the temperature of the refrigerant in the liquid phase stored in the condenser is defined as a second temperature, the controller controls the wet steam generator
to increase a wetness fraction of the refrigerant to be supplied to the compressor if a temperature difference between the first temperature and the second temperature is equal to or higher than a threshold, and
to decrease a wetness fraction of the refrigerant to be supplied to the compressor if the temperature difference is zero.

14. The heat pump apparatus according to claim 12, further comprising:
a second detector that is disposed lower than the liquid level of the refrigerant in the liquid phase stored in the condenser and detects the temperature of the refrigerant in the liquid phase.

15. The heat pump apparatus according to claim 12, further comprising:
a second detector that detects a pressure inside the condenser, wherein
the controller derives the temperature of the refrigerant in the liquid phase stored in the condenser based on the pressure detected by the second detector.

16. The heat pump apparatus according to claim 15, wherein the second detector is disposed higher than the liquid level of the refrigerant in the liquid phase stored in the condenser.

* * * * *